US011194228B2

(12) United States Patent
Albertse

(10) Patent No.: US 11,194,228 B2
(45) Date of Patent: Dec. 7, 2021

(54) EVIDENCE CAPTURING

(71) Applicant: SOLVE FORENSICS (PTY) LTD, Pretoria (ZA)

(72) Inventor: Sietze Sibo Albertse, Pretoria (ZA)

(73) Assignee: SOLVE FORENSICS (PTY) LTD, Pretoria (ZA)

(*) Notice: Subject to any disclaimer, the term of this patent is extended or adjusted under 35 U.S.C. 154(b) by 0 days.

(21) Appl. No.: 16/633,515

(22) PCT Filed: Jul. 24, 2018

(86) PCT No.: PCT/IB2018/055489
§ 371 (c)(1),
(2) Date: Jan. 23, 2020

(87) PCT Pub. No.: WO2019/021168
PCT Pub. Date: Jan. 31, 2019

(65) Prior Publication Data
US 2020/0233281 A1 Jul. 23, 2020

(30) Foreign Application Priority Data
Jul. 24, 2017 (ZA) .................................. 2017/05010

(51) Int. Cl.
*G03B 17/56* (2021.01)
*G03B 15/02* (2021.01)
(Continued)

(52) U.S. Cl.
CPC ............ *G03B 11/04* (2013.01); *F16M 11/08* (2013.01); *F16M 11/22* (2013.01); *F16M 13/02* (2013.01);
(Continued)

(58) Field of Classification Search
CPC ...... G03B 11/04; G03B 15/02; G03B 17/561; G03B 2215/0517; F16M 11/08; F16M 13/02; G02B 7/006
See application file for complete search history.

(56) References Cited

U.S. PATENT DOCUMENTS 5,034,615 A 7/1991 Rios et al.
5,950,017 A 9/1999 Reff
(Continued)

FOREIGN PATENT DOCUMENTS

CN 104197159 A 12/2014

OTHER PUBLICATIONS

International Search Report and Written Opinion dated Nov. 15, 2018 for International Application No. PCT/IB2015/055489, 12 pages.

*Primary Examiner* — Minh Q Phan
(74) *Attorney, Agent, or Firm* — Casimir Jones, S.C.; Lisa V. Mueller

(57) ABSTRACT

An evidence capturing device, which includes an elongate tubular body having a first object end and a second, camera mounting, end, with an optical path defined between the object end and the camera mounting end, a bracket at the camera mounting end of the body for mounting a camera to the body, so that a mounted camera is directed towards the object end of the body at which an object plane is defined perpendicular to the body, a filter holder disposed in the optical path between the object end and the camera end, a light source housing protruding from the body between the object end and the camera end for mounting a light source so that a mounted light source is directed at the object plane from an angle and a rotatable ring for rotating the camera and light source housing relative to each other about an elongate axis of the body.

20 Claims, 3 Drawing Sheets

(51) Int. Cl.
*F16M 11/08* (2006.01)
*F16M 13/02* (2006.01)
*G02B 7/00* (2021.01)
*G03B 11/04* (2021.01)
*F16M 11/22* (2006.01)

(52) U.S. Cl.
CPC ............ *G02B 7/006* (2013.01); *G03B 15/02* (2013.01); *G03B 17/561* (2013.01); *G03B 17/565* (2013.01); *G03B 2215/0517* (2013.01)

(56) References Cited

U.S. PATENT DOCUMENTS

| | | | |
|---|---|---|---|
| 6,862,093 B2 | 3/2005 | Peng et al. | |
| 7,050,715 B1 | 5/2006 | Carrington et al. | |
| 7,460,777 B1 | 12/2008 | Hines | |
| 9,280,037 B2 * | 3/2016 | Leblanc | F16M 13/022 |
| 2005/0089323 A1 | 4/2005 | Chapman et al. | |
| 2006/0077536 A1 | 4/2006 | Bromage | |
| 2007/0279519 A1 | 12/2007 | Sukenari et al. | |
| 2014/0098225 A1 | 4/2014 | Rodriguez et al. | |
| 2014/0297413 A1 | 10/2014 | Thomas et al. | |
| 2015/0278206 A1 | 10/2015 | Lytell | |
| 2016/0116825 A1 | 4/2016 | Alshuler | |

\* cited by examiner

EVIDENCE CAPTURING

CROSS-REFERENCE TO RELATED APPLICATIONS

This application is a national phase application under 35 U.S.C. § 371 of PCT International Application No. PCT/IB2018/055489, filed Jul. 24, 2018, which claims priority to South African Application No. 2017/05010, filed Jul. 24, 2017, each of which are hereby incorporated by reference in its entirety.

FIELD OF THE INVENTION

This invention relates to evidence capturing. In particular, the invention relates to an evidence capturing device and to an evidence capturing kit.

BACKGROUND OF THE INVENTION

In the gathering of forensic evidence, it is important to gather the evidence without disturbing other evidence.

The use of forensic light sources in analysing trace evidence were found to be effective in revealing fingerprints, hairs, fibres, bone fragments, chemical accelerants and biological fluids such as blood, semen, urine and saliva. The light source emits light at a selected wavelength that can be filtered into individual colour bands to enhance visualisation of evidence. Various light sources such as lamps and Light Emitting Diodes are used.

When capturing evidence by camera, it is important to optimise the illumination of the evidence with a particular type of light source, while retaining the camera in a stable position so that the images captured by camera are of high quality and sufficient for use in subsequent proceedings.

The inventor found that exiting techniques of illuminating the evidence and capturing images of evidence were often not producing results that were acceptable in subsequent proceedings.

The present invention aims to address this shortcoming.

SUMMARY OF THE INVENTION

According to one aspect of the invention, there is provided an evidence capturing device, which includes;

an elongate tubular body having a first object end and a second, camera mounting, end, with an optical path defined between the object end and the camera mounting end;

a bracket at the camera mounting end of the body for mounting a camera to the body, so that a mounted camera is directed towards the object end of the body at which an object plane is defined perpendicular to the body;

a filter holder disposed in the optical path between the object end and the camera end;

a light source housing protruding from the body between the object end and the camera end for mounting a light source so that a mounted light source is directed at the object plane from an angle; and a rotatable ring for rotating the camera and light source housing relative to each other about an elongate axis of the body.

The bracket may be secured to the body such that the camera is at a fixed distance from the evidence to be viewed on the object plane. The camera may be secured in position to inhibit camera movement once it has been mounted to the bracket.

The evidence capturing device may include a lock plate for securing the camera in position.

The bracket may be interchangeable with other brackets, each bracket for mounting a particular type of camera. Preferably the camera may be a Digital Single Lens Reflex (DSLR) camera.

The light source housing may be shaped and dimensioned to receive a variety of light sources.

The light source housing may hold the light source at an angle of 45° to the object plane.

The direction of illumination from the light source, being referred to as the impact angle, may be adjustable by rotation of the light source housing on the rotatable ring.

The light source housing may be rotatable through 360° about the elongate axis on the rotatable ring to adjust the direction at which light projects onto the object plane.

The light source housing may include fastening means to secure a light source to the light source housing.

The fastening means may be in the form of a flare lock.

The light source housing may include a hand grip which covers at least part of the external surface of the light source housing.

The elongate tubular body may have a reflective inner surface to reflect the light from the light source. Advantageously, in use, the mounted camera and light source may have a light-tight connection to eliminate any stray light from entering the elongate tubular body.

The evidence capturing device may include a detachable base at the object end of the body enabling the device to rest upon a surface surrounding the object plane for viewing and capturing forensic evidence on the object plane.

The evidence capturing device may include a stand to provide the body with support on a surface when the base is not attached.

The base may be made of a flexible material to accommodate the surface surrounding the object plane, when in use.

The base may be cone shaped.

The object end may include a scale for indicating the dimensions of the evidence being viewed.

The elongate tubular body may include a receiving slot for receiving the filter holder. The filter holder may be shaped and dimensioned to fit tightly within the filter receiving slot such that light is inhibited from entering or escaping the body.

The filter holder may include more than one aperture for holding more than one interchangeable filter. The interchangeable filters may all be of the same size, the apertures being the same size. Alternatively, the interchangeable filters may be of different diameters, the apertures being of different apertures. The interchangeable filters may be in the form of small or large barrier filters. The interchangeable filters may be in the form of coloured filters.

The body may include a magnet within the vicinity of the filter receiving slot, the filter holder including a complementary magnet on an insertion end, which together with the magnet on the body, locates the filter holder in position on the body.

In use, the device may be placed over the evidence to be captured and the wavelength of the light source selected, the interchangeable filter corresponding to the selected wavelength being inserted into the slot. When the light source and interchangeable filter have been selected, the rotatable ring may be used to adjust the impact angle of light.

The evidence may be in the form of a fingerprint, blood stain, hair, fibres or the like.

According to another aspect of the invention, there is provided an evidence capturing kit, which includes:
  an evidence capturing device, as described;
  a plurality of interchangeable filters receivable into a filter holder of the device;
  a camera mountable onto a bracket of the device; and
  a light source mountable onto a light source housing of the device.

The plurality of interchangeable filters may be coloured filters, the colour of a specific filter corresponding with a specific wavelength of light.

The camera may be in the form of a Digital Single Lens Reflex (DSLR) camera.

The light source may be in the form of a forensic light source. Preferably the light source may be in the form of a Polilight® Flare.

The light source may be capable of switching between different wavelengths, each wavelength being suited to a specific interchangeable filter. The forensic light source may be in the form of a LED, laser, Polilight® Flare or the like.

The invention is now described, by way of non-limiting example, with reference to the accompanying figures:

FIGURE(S)

In the figure(s):

In the figures, like reference numerals denote like parts of the invention unless otherwise indicated.

EMBODIMENT OF THE INVENTION

Figure 1:
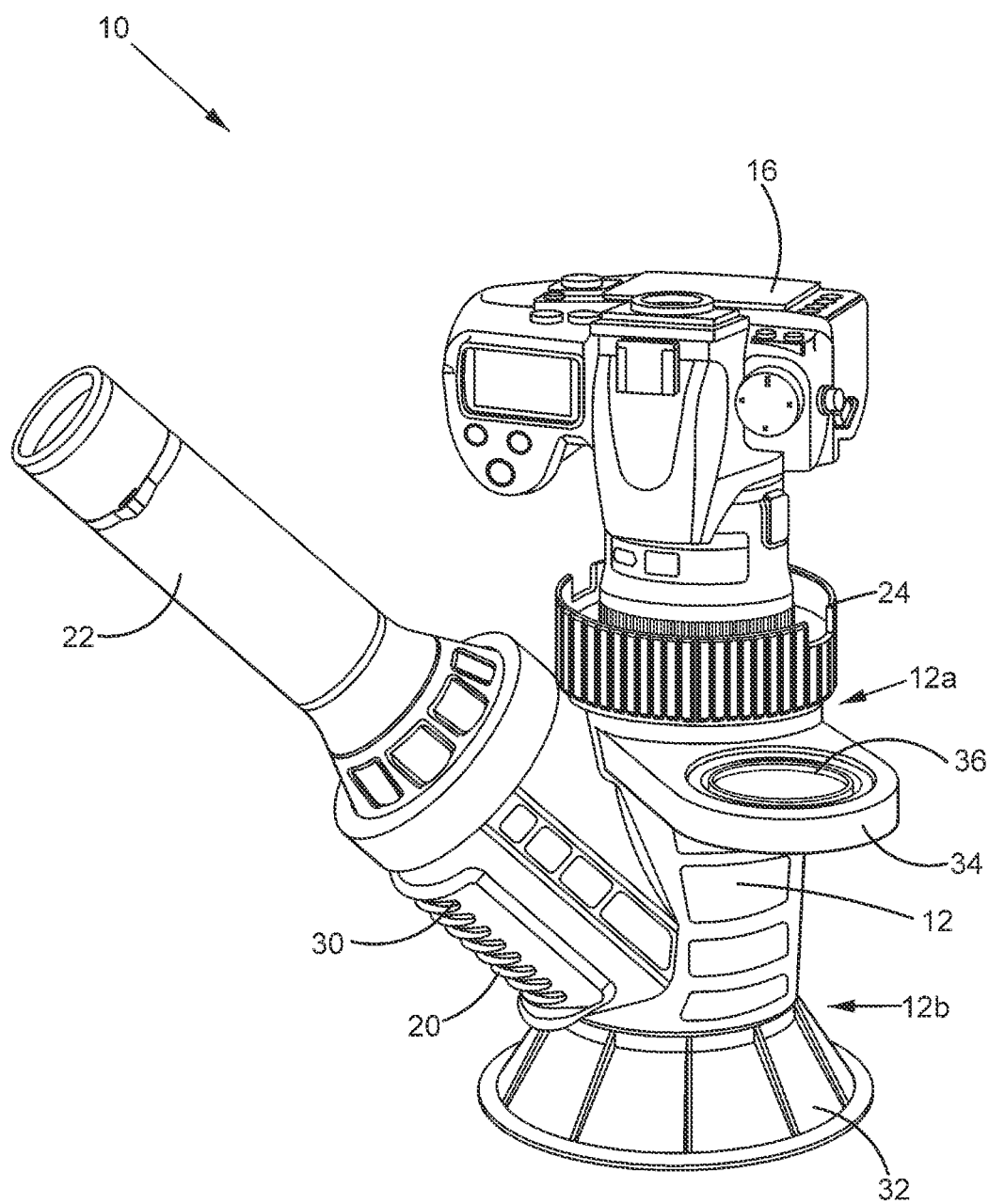
FIG. 1 shows a three dimensional view of an evidence capture device according to one aspect of the invention in use.

In the Figures, reference numeral (10) refers to an evidence capturing device. The device (10) includes an elongate tubular body (12) having a first object end (12b) and a second camera mounting end (12a). The device (10) includes a bracket (14) at the camera mounting end (12a) of the body (12) for mounting a camera (16) to the elongate tubular body (12). The mounted camera (16) is directed towards the object end (12b) of the body (12) at which an object plane is defined perpendicular to the body (12). The device (10) also includes a filter receiving slot (18) within the body (12). The filter receiving slot (18) is in an optical path between the object end (12b) and the camera end (12a). The device (10) further includes a light source housing (20) protruding from the body (12) between the object end (12b) and the camera end (12a) for receiving a light source (22). The mounted light source (22) being directed at the object end (12b) of the body (12). The device (10) has a rotatable ring (24) for rotating the camera (16) and light source housing (20) relevant to each other about an elongate axis of the body (12).

The bracket (14) is secured to the body (12) such that the camera (16) is at a fixed distance from the evidence to be viewed on the object plane. Advantageously, this allows one time manual focus or auto focus of the camera (16). The camera (16) is secured in position with a lock plate (26) which inhibits camera (16) movement once it has been mounted to the bracket (14). The bracket (14) is adaptable for mounting different kinds of cameras.

The light source housing (20) includes a quick release coupler, for easy and effortless exchange between light sources (22).

In FIG. 1, the light source (22) is in the form of a Polilight® Flare mounted on the light source housing (20) which projects light into the body (12) at a 45° angle, the light having an impact angle on the object plane. The Polilight® Flare (22) lights must be manually exchanged to switch between different wavelengths, each wavelength being suited to a specific interchangeable filter (18).

The rotatable ring (24) rotates the light source housing (20) 360° about the elongate axis of the body (12), to adjust the direction at which light projects onto the object plane.

Figure 2:
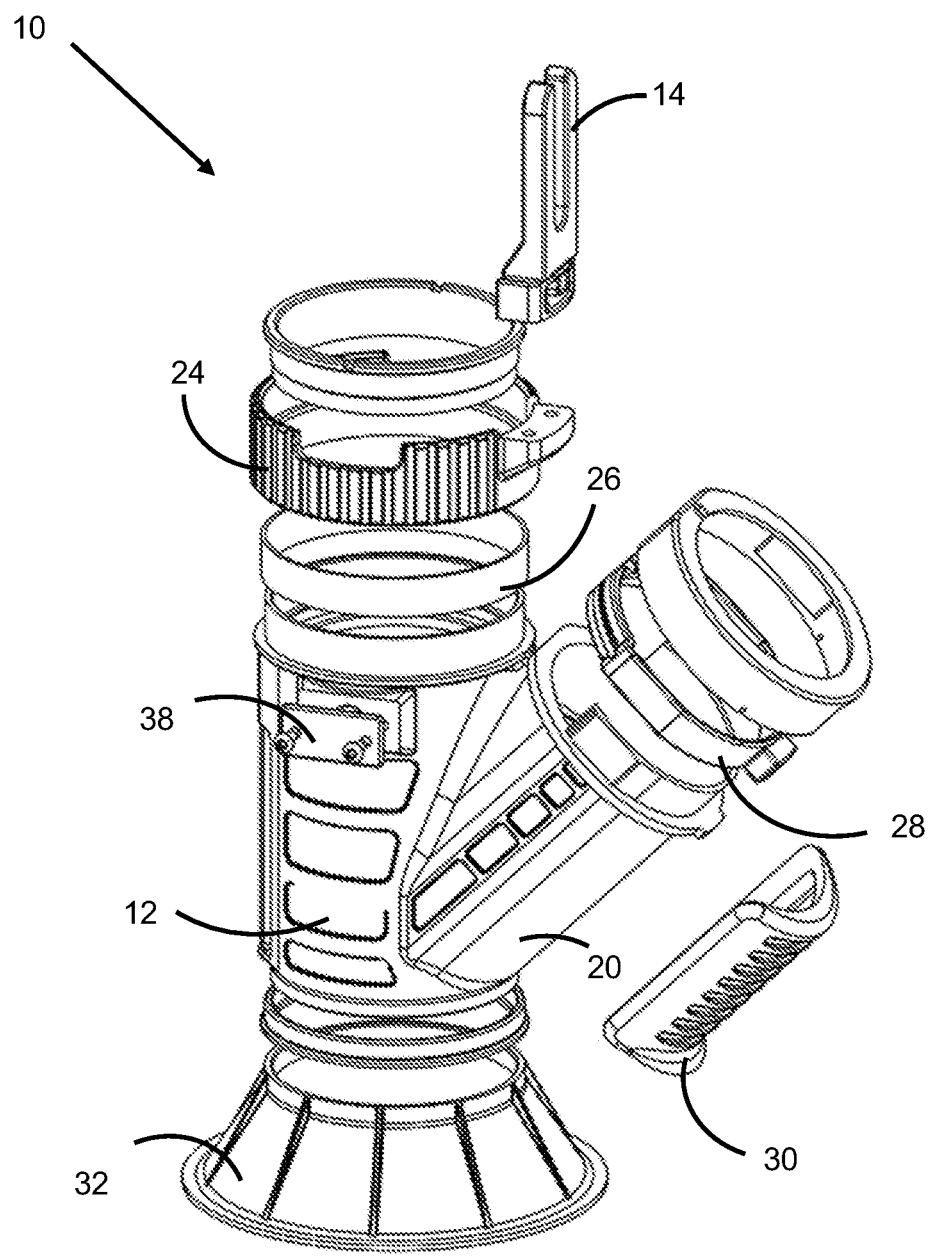
FIG. 2 shows an exploded view of the evidence capture device of FIG. 1 when it is not in use.

As shown in FIG. 2, the light source housing (20) includes fastening means (28) to secure the light source (22) to the light source housing (20). In this example the fastening means (28) is in the form of a flare lock. The light source housing (20) also has a hand grip (30) which covers at least part of the external surface of the light source housing (20).

The elongate tubular body (12) has a reflective inner surface to reflect the light entering the body (12) from the light source (22).

The mounted camera (16) and light source (22) have a light-tight connection to the elongate tubular body (12) such that any ambient light is inhibited from entering the body (12).

The body (12) includes a detachable base (32) at the object end (12b) of the body (12) enabling the device (10) to rest upon a surface surrounding the object plane for viewing and capturing forensic evidence on the object plane. In use, the device (10) is placed over a piece of evidence, with the base (32) surrounding the evidence. Advantageously, the stability provided by the base (32) allows for longer exposure times without the aid of a tripod.

The base (32) is made of a flexible material to conform to the surface surrounding the object plane.

The object end (12b) has a scale (not shown) for indicating the dimensions of the evidence being viewed.

The device (10) includes a filter holder (34) which is receivable into the filter receiving slot (18), the filter holder (34) being shaped and dimensioned to fit tightly within the filter receiving slot (18) such that light is inhibited from entering or escaping the body (12).

As shown in FIG. 2, the body (12) includes a magnet (38) within the vicinity of the filter receiving slot (18). The filter holder (34) also includes a magnet on an insertion end (not shown) which together with the magnet (38) within the body (12), enables rapid changing of the filter holder (34). The magnet secures the filter holder.

Figure 3:
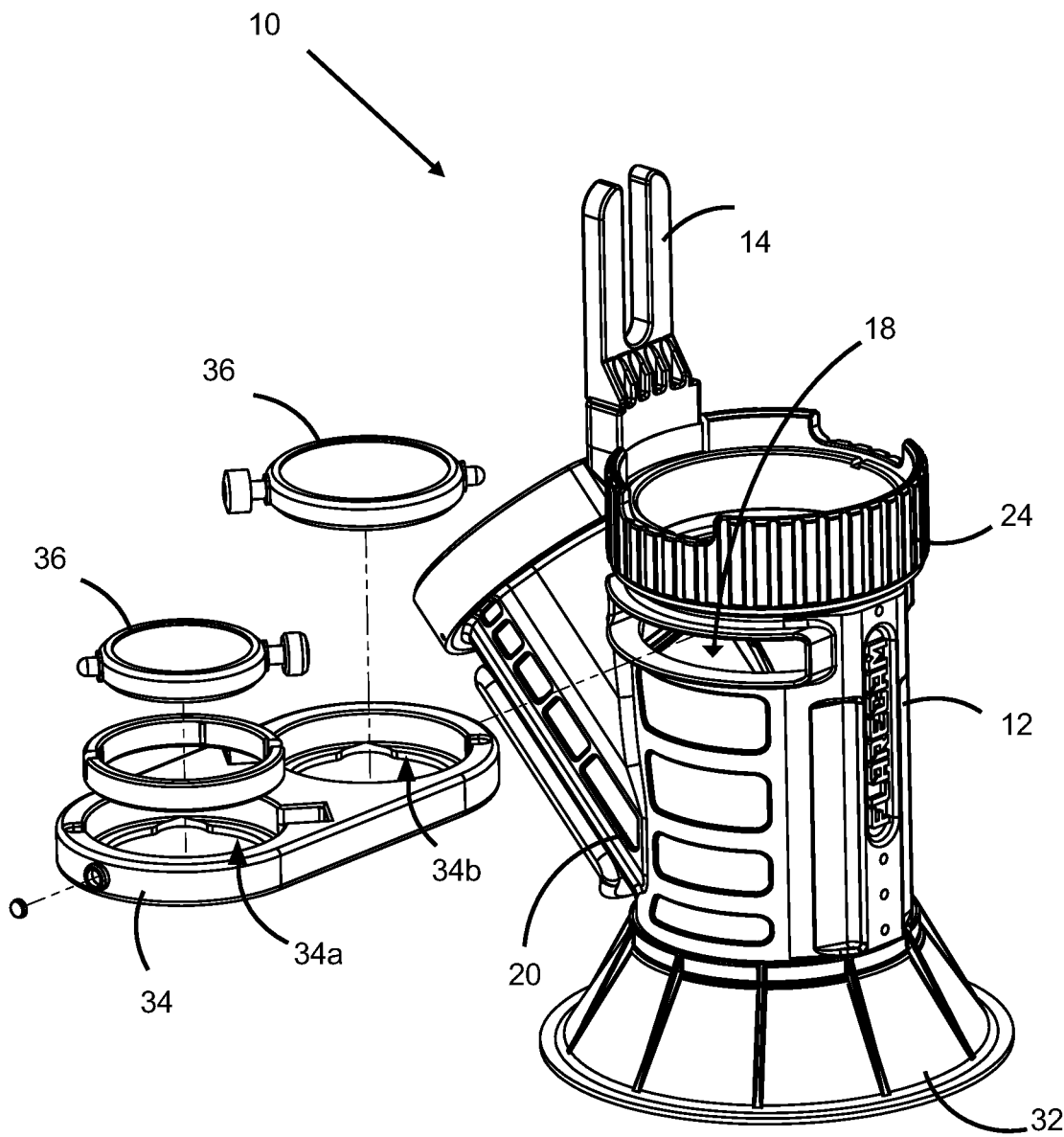
FIG. 3 shows a three dimensional view of the evidence capture device showing a filter holder and interchangeable filters.

As shown in FIG. 3, the filter holder (34) has a first (34a) and second aperture (34b) for receiving a pair of interchangeable filters (36). In this example, the pair of interchangeable filters (36) are of different sizes, one interchangeable filter having a larger diameter than the other.

In use, the device (10) is placed over the evidence to be captured and the wavelength of the light source (22) is selected, the interchangeable filter (36) corresponding to the selected wavelength being inserted into the filter receiving slot (18). When the selection has been made, the rotatable ring (24) is rotated to adjust the impact angle of light.

The inventor believes that the invention provides a new evidence capturing device and a new evidence capturing kit, which could be used to capture evidence in a reliable and repeatable manner that will provide good quality images that can be used in subsequent proceedings.

The invention claimed is:

1. An evidence capturing device, which includes;
   an elongate tubular body having a first object end and a second camera mounting end with an optical path defined between the object end and the camera mounting end;
   a bracket at the camera mounting end of the body for mounting a camera to the body, so that a mounted camera is directed towards the object end of the body at which an object plane is defined perpendicular to the body;
   a filter holder disposed in the optical path between the object end and the camera end;
   a light source housing protruding from the body between the object end and the camera end for mounting a light source so that a mounted light source is directed at the object plane from an angle; and
   a rotatable ring for rotating the camera and light source housing relative to each other about an elongate axis of the body.

2. The evidence capturing device as claimed in claim 1, in which the bracket is secured to the body such that the camera is at a fixed distance from the evidence to be viewed on the object plane.

3. The evidence capturing device as claimed in claim 2, which includes a lock plate for securing the camera in position.

4. The evidence capturing device as claimed in claim 1, in which the bracket is interchangeable with other brackets, each bracket for mounting a particular type of camera.

5. The evidence capturing device as claimed in claim 1, in which the light source housing holds the light source at an angle of 45° to the object plane.

6. The evidence capturing device as claimed in claim 5, in which the direction of illumination from the light source, being referred to as an impact angle, is adjustable by rotation of the light source housing on the rotatable ring.

7. The evidence capturing device as claimed in claim 6, in which the light source housing is rotatable through 360° about the elongate axis on the rotatable ring to adjust the direction at which light projects onto the object plane.

8. The evidence capturing device as claimed in claim 7, in which the light source housing includes fastening means to secure a light source to the light source housing, the fastening means being in the form of a flare lock.

9. The evidence capturing device as claimed in claim 1, in which the elongate tubular body has a reflective inner surface to reflect the light from the light source.

10. The evidence capturing device as claimed in claim 1, which includes a detachable base at the object end of the body enabling the device to rest upon a surface surrounding the object plane for viewing and capturing forensic evidence on the object plane.

11. The evidence capturing device as claimed in claim 1, which includes a stand to provide the body with support on a surface when the base is not attached.

12. The evidence capturing device as claimed in claim 10, in which the base is made of a flexible material to accommodate the surface surrounding the object plane, when in use.

13. The evidence capturing device as claimed in claim 10, in which the base is cone shaped.

14. The evidence capturing device as claimed in claim 1, in which the elongate tubular body includes a receiving slot for receiving the filter holder.

15. The evidence capturing device as claimed in claim 1, in which the filter holder includes more than one aperture for holding more than one interchangeable filter.

16. An evidence capturing kit, which includes:
    an evidence capturing device, as claimed in claim 1;
    a plurality of interchangeable filters receivable into a filter holder of the device;
    a camera mountable onto a bracket of the device; and
    a light source mountable onto a light source housing of the device.

17. The evidence capturing kit as claimed in claim 16, in which the plurality of interchangeable filters are coloured filters, the colour of a specific filter corresponding with a specific wavelength of light.

18. The evidence capturing kit as claimed in claim 16, in which the camera is in the form of a Digital Single Lens Reflex (DSLR) camera.

19. The evidence capturing kit as claimed in claim 16, in which the light source is in the form of a forensic light source.

20. The evidence capturing kit as claimed in claim 19, in which the light source is capable of switching between different wavelengths, each wavelength being suited to a specific interchangeable filter.

* * * * *